3,080,396
6-CHLOROMETHYL DERIVATIVES OF THE PREGNANE SERIES

John Edwards, Mexico City, Mexico, assignor, by mesne assignments, to Syntex Corporation, a corporation of Panama
No Drawing. Filed May 2, 1961, Ser. No. 107,041
14 Claims. (Cl. 260—397.4)

The present invention relates to novel cyclopentanophenanthrene compounds and to a process for the production thereof.

More particularly the present invention relates to 6-chloromethyl derivatives of the pregnane series and to certain novel intermediates.

The novel compounds of this invention which are potent progestational compounds with a high degree of oral activity are represented by the following formulae:

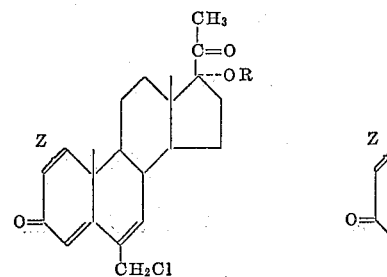
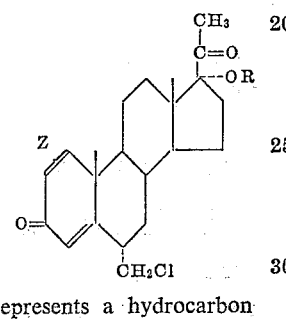

In the above formulae, R represents a hydrocarbon carboxylic acyl group containing less than 12 carbon atoms and Z represents a double bond or a saturated linkage between C–1 and C–2. The acyl group is derived from hydrocarbon carboxylic acids of less than twelve carbon atoms, saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino, nitro or halogen. Typical ester groups are the acetate, propionate, butyrate, benzoate, cyclopentylpropionate, aminoacetate, $\beta$-chloropropionate, hemisuccinate, enanthate, caproate, trimethylacetate, methoxyacetate, phenoxyacetate, and phenylpropionate.

The novel compounds of the present invention may be prepared by a process illustrated by the following equation:

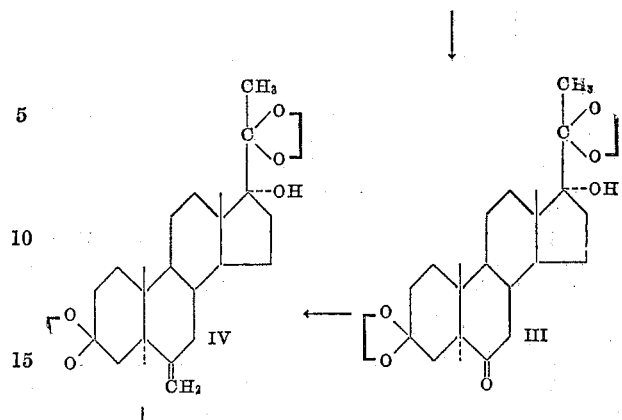
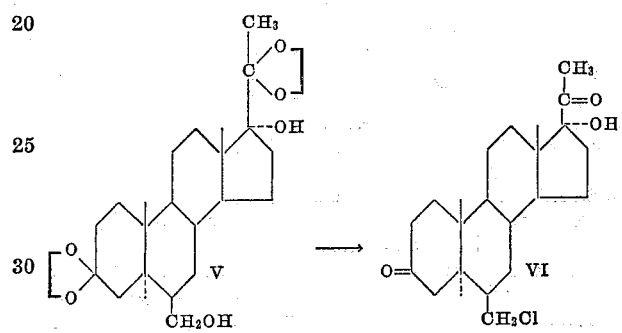
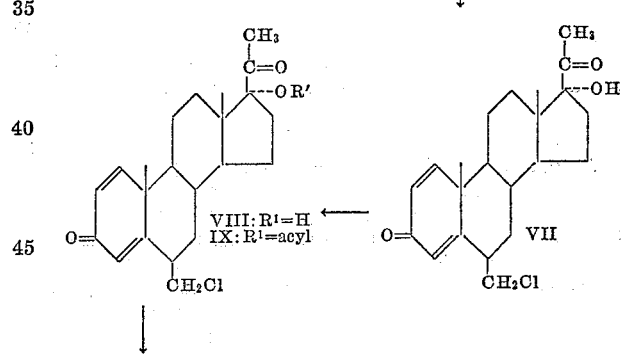
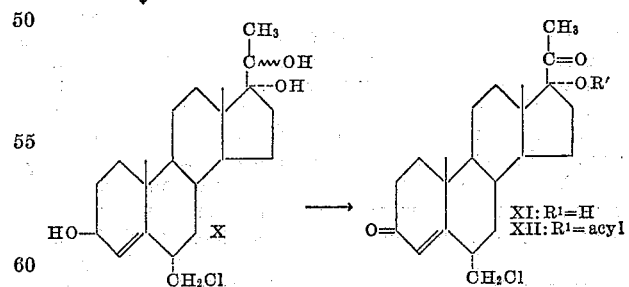
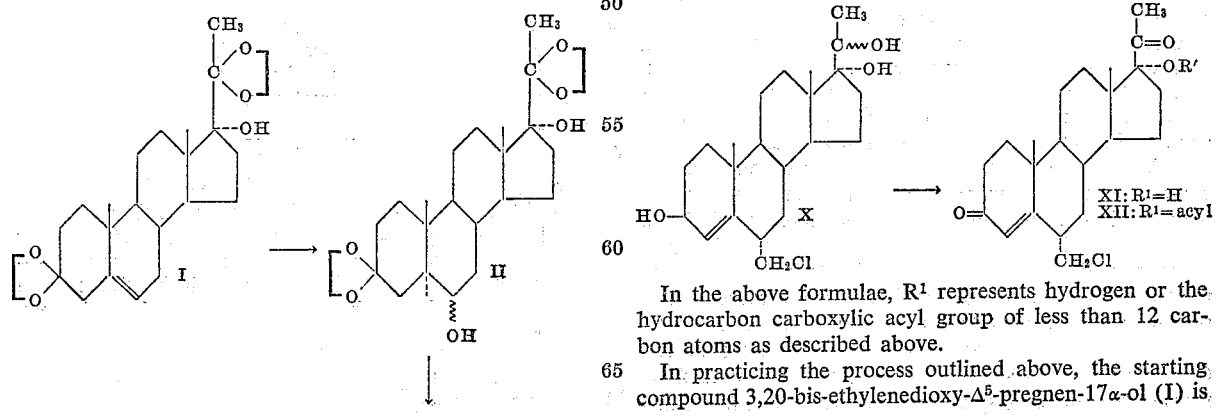

In the above formulae, $R^1$ represents hydrogen or the hydrocarbon carboxylic acyl group of less than 12 carbon atoms as described above.

In practicing the process outlined above, the starting compound 3,20-bis-ethylenedioxy-$\Delta^5$-pregnen-17$\alpha$-ol (I) is obtained by refluxing 17α-hydroxyprogesterone with ethylene glycol. The above diketal is treated with diborane and subsequently oxidized with hydrogen peroxide, thus affording a mixture of 6-hydroxy derivative epimers (II) which upon oxidation and subsequent treatment with a base furnish 3,20-bis-ethylenedioxy-allopregnan-17α-ol-6-one (III). This compound is treated with triphenylphosphonium methyl bromide in the presence of an organolithium compound such as butyl lithium thus affording the 6-methylene derivative (IV) which upon treatment with diborane and subsequent oxidation of the organoboron compound formed, affords 3,20-bis-ethylenedioxy - 6β - hydroxymethyl - allopregnan-17α-ol (V). Upon tosylation of this latter compound, followed by treatment with an alkali metal chloride such as lithium chloride and subsequent hydrolysis of the ketal group, there is obtained 6β-chloromethyl-allopregnan-17α-ol-3,20-dione (VI).

Dehydrogenation of the foregoing steroid with a suitable reagent such as 2,3-dichloro-5,6-dicyano-1,4-benzoquinone affords 6β-chloromethyl-$\Delta^{1,4}$-pregnadien-17α-ol-3,20-dione (VII) which upon treatment with an acid such as hydrogen chloride in chloroform is isomerized to the 6α-chloromethyl derivative (VIII). Treatment of this compound with an acylating agent such as acetic anhydride, in the presence of p-toluenesulfonic acid, affords the corresponding 17α-ester, being obtained in this case the 17α-acetate of 6α-chloromethyl-$\Delta^{1,4}$-pregnadien-17α-ol-3,20-dione (IX).

This last compound is dehydrogenated between C–6 and C–7 with a suitable reagent, as for example, chloranil, to give 6-chloromethyl - $\Delta^{1,4,6}$ - pregnatrien-17α-ol-3,20-dione-17α-acetate. Reduction of 6α-chloromethyl-$\Delta^{1,4}$-pregnadien-17α-ol-3,20-dione (VIII) with sodium borohydride furnishes a mixture of the 20-hydroxy epimers of 6α-chloromethyl-$\Delta^4$-pregnene-3β,17α,20-triol (X) which upon chromic acid oxidation afford 6α-chloromethyl-$\Delta^4$-pregnen-17α-ol-3,20-dione (XI).

This compound is treated with an acylating reagent such as acetic anhydride in the presence of p-toluenesulfonic acid, thus giving the corresponding ester (XII), in this instance the 17α-acetate which upon dehydrogenation with a suitable agent such as chloranil in t-butanol affords 6-chloromethyl-$\Delta^{4,6}$-pregnadien-17α-ol-3,20-dione-17α-acetate.

The following specific examples serve to illustrate but are not intended to limit the present invention:

*Example I*

A solution of 10 g. of 17α-hydroxy-progesterone $\Delta^4$-pregnen-17α-ol-3,20-dione), 0.5 g. of p-toluenesulfonic acid and 50 cc. of ethylene glycol distilled over sodium hydroxide in 150 cc. of anhydrous benzene was refluxed for 12 hours, using an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-bis-ethylenedioxy-$\Delta^5$-pregnen-17α-ol.

A slow stream of diborane was passed through a solution of the above compound in 150 cc. of anhydrous tetrahydrofuran for one hour. (After 20 minutes the solution became warm and then the temperature slowly subsided.) The excess of diborane was decomposed by careful addition of water. Then one liter of water was added and the formed precipitate was filtered, washed and dried, thus giving an organoboron compound. This material was dissolved in 200 cc. of tetrahydrofuran and treated with 9 g. of sodium hydroxide previously dissolved in 25 cc. of water and 45 cc. of 35% hydrogen peroxide, stirring and keeping the temperature around 15° C. The mixture was stirred for 2 hours, the precipitate formed was filtered off, washed and dried, thus furnishing a mixture of 3,20-bis-ethylenedioxy-allopregnane-6α,-17α-diol and 2,20 bis-ethylenedioxy-pregnane-6β,17α-diol.

A solution of 6 g. of the above compound in 120 cc. of pyridine was added to a mixture of 6 g. of chromium trioxide in 120 cc. of pyridine. The reaction mixture was kept at room temperature overnight, then diluted with ethyl acetate, filtered through celite and the filtrate washed well with water, dried and evaporated to dryness.

The solid residue which was a mixture of 3,20-bis-ethylenedioxy-pregnan-17α-ol-6-one and mainly 3,20-bis-ethylenedioxy-allopregnan-17α-ol-6-one, was converted totally into the latter compound, by treatment with a solution of 6 g. of potassium hydroxide in 100 cc. of methanol for 4 hours. After addition of water the precipitate thus formed was filtered off, washed thoroughly with water and air dried.

A suspension of 14.5 g. of triphenylphosphonium methyl bromide in 250 cc. of anhydrous ether was treated, under an atmosphere of nitrogen, with 40 cc. of a 1 N ethereal solution of butyl lithium and the mixture was stirred for 2 hours at room temperature. A solution of 5 g. of 3,20-bis-ethylenedioxy-allopregnan-17α-ol-6-one in 100 cc. of ether was then added dropwise in the course of 15 minutes with constant stirring. The reaction mixture was stirred further for 6 hours and kept at room temperature overnight. The ether was displaced with dry tetrahydrofuran by distillation and then refluxed for 8 hours. It was then cooled, diluted with water and extracted several times with ethyl acetate. The organic extract was washed with water, dried over anhydrous sodium sulfate and evaporated to dryness. Chromatography of the residue and recrystallization of the solid eluates from acetone-hexane afforded 3,20-bis-ethylenedioxy-6-methylene-allopregnan-17α-ol.

3 g. of the foregoing steroid were treated with diborane and the organoboron compound thus obtained was oxidized with hydrogen peroxide following the technique described hereinabove, thus giving 3,20-bis-ethylenedioxy-6β-hydroxymethyl-allopregnan-17α-ol.

2.5 g. of this last compound in 40 cc. of pyridine were treated with 2 g. of p-toluenesulfonyl chloride for 6 hours at room temperature. The mixture was treated carefully with water and then more water was added. The product was extracted with methylene chloride, the extract washed successively with dilute hydrochloric acid, 5% sodium bicarbonate aqueous solution, water to neutral, dried over sodium sulfate and evaporated to dryness, affording 3,20-bis-ethylenedioxy-6β-tosyloxy-methyl-allopregnan-17α-ol.

A suspension of 10 g. of lithium chloride in 50 cc. of dimethylformamide was heated to boiling and then a solution of 2 g. of the above tosylate in 10 cc. of dimethylformamide was added. The mixture was refluxed for 8 hours, cooled and poured into water. The formed precipitate was filtered off and crystallized to give 3,20-bis-ethylenedioxy-6β-chloromethyl-allopregnan-17α-ol.

A solution of 1 g. of the last compound in 30 cc. of acetone was treated with 0.7 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane afforded 6β-chloromethyl-allopregnan-17α-ol-3,20-dione.

*Example II*

A mixture of 500 mg. of 6β-chloromethyl-allopregnan-17α-ol-3,20-dione, 20 cc. of t-butanol and 500 mg. of 2,3-dichloro-5,6-dicyano-1,4-benzoquinone was refluxed for 40 hours. It was then cooled, the 2,3-dichloro-5,6-dicyano-1,4-benzo-hydroquinone formed during the reaction was filtered off and the filtrate evaporated to dryness. The residue was dissolved in acetone and filtered through a column of 10 g. of alumina. Crystallization from acetone-hexane afforded 6β-chloromethyl-$\Delta^{1,4}$ - pregnadien-17α-ol-3,20-dione.

Example III

Several batches of this last compound were combined, amounting to 3 g. This material was treated with 50 cc. of saturated solution of hydrogen chloride in chloroform for 8 hours. The reaction mixture was washed successively with a 5% sodium bicarbonate aqueous solution and water to neutral. The organic solution was dried over anhydrous sodium sulfate and evaporated to dryness. Recrystallization from methylene chloride-hexane afforded 6α-chloromethyl-$\Delta^{1,4}$-pregnadien-17α-ol-3,20-dione.

Example IV

A solution of 1 g. of the foregoing compound, 1 g. of p-toluenesulfonic acid hydrate and 10 cc. of acetic anhydride in 50 cc. of acetic acid after one hour reaction at room temperature was poured into water and stirred until the excess anhydride was hydrolyzed. Isolation of the product by methylene chloride extraction and crystallization of the residue from acetone-hexane gave the 17α-acetate of 6α-chloromethyl-$\Delta^{1,4}$-pregnadien-17α-ol-3,20-dione.

By substituting the acetic anhydride by other hydrocarbon carboxylic acid anhydrides containing up to 12 carbon atoms, there were produced other 17-esters. Specifically there was prepared the propionate, cyclopentyl-propionate, caproate and benzoate of 6α-chloromethyl-$\Delta^{1,4}$-pregnadien-17α-ol-3,20-dione.

Example V

A mixture of 750 mg. of 6α-chloromethyl-$\Delta^{1,4}$-pregnadien-17α-ol-3,20-dione-17-acetate, 1.5 g. of chloranil and 50 cc. of t-butanol was refluxed for 30 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether afforded 6-chloromethyl-$\Delta^{1,4,6}$-pregnatrien-17α-ol-3,20-dione 17-acetate.

In a similar manner the other esters produced in the preceding example were dehydrogenated and there was produced the corresponding esters further dehydrogenated between C–6 and C–7. There was thus produced the propionate, cyclopentylpropionate, caproate and benzoate of 6-chloromethyl-$\Delta^{1,4,6}$-pregnatrien-17α-ol-3,20-dione.

Example VI 2 g. of 6α-chloromethyl-$\Delta^{1,4}$-pregnadien-17α-ol-3,20-dione (obtained according to Example III) in 200 cc. of methanol were treated with 2 g. of sodium borohydride in 5 cc. of water. The mixture was kept overnight at room temperature. The excess reagent was decomposed by addition of acetic acid, the resulting solution was concentrated under vacuum to a small volume and diluted with water. The product was extracted with ethyl acetate, the extract washed with water, dried and evaporated. The solid residue was recrystallized from acetone-hexane to give 6α-chloromethyl-$\Delta^{4}$-pregnene-3β,17α,20-triol.

A solution of 2.2 equivalents of chromic acid in 5 cc. of 80% acetic acid was added dropwise to a stirred solution of 1.5 g. of the foregoing steroid in 15 cc. of glacial acetic acid, while the temperature was maintained at 20° C. After 2 hours at room temperature, the mixture was poured into ice water and the precipitate formed was collected, washed with water and recrystallized from methanol, giving 6α-chloromethyl-$\Delta^{4}$-pregnen-17α-ol-3,20-dione.

Example VII 1 g. of the foregoing compound was acetylated following the method described in Example IV, furnishing 6α-chloromethyl-$\Delta^{4}$-pregnen-17α-ol-3,20-dione 17α-acetate.

Example VIII

The above compound was dehydrogenated with chloranil in accordance wth the method described in Example V, affording 6-chloromethyl-$\Delta^{4,6}$-pregnadien-17α-ol-3,20-dione 17α-acetate.

Example IX

By substituting in the method of Example VII the acetic anhydride by other hydrocarbon carboxylic acid anhydrides containing up to 12 carbon atoms, there were produced the corresponding 17-esters. Thus there was prepared the caproate, propionate, cyclopentyl propionate and benzoate of 6α-chloromethyl-$\Delta^{4}$-pregnen-17α-ol-3,20-dione.

By applying the method described in Example V to the foregoing esters there were formed the corresponding esters of 6-chloromethyl-$\Delta^{4,6}$-pregnadien-17α-ol-3,20-dione.

I claim:

1. A compound of the following formula:

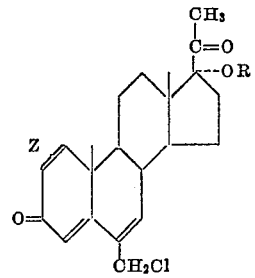

wherein R is a hydrocarbon carboxylic acyl group of less than 12 carbon atoms and Z is selected from the group consisting of a double bond and a saturated linkage between C–1 and C–2.

2. The hydrocarbon carboxylic acid esters of less than 12 carbon atoms of 6-chloromethyl-$\Delta^{4,6}$-pregnadien-17α-ol-3,20-dione.

3. 6-chloromethyl-$\Delta^{4,6}$-pregnadien-17α-ol-3,20-dione-17α-acetate.

4. The hydrocarbon carboxylic acid esters of less than 12 carbon atoms of 6-chloromethyl-$\Delta^{1,4,6}$-pregnatrien-17α-ol-3,20-dione.

5. 6-chloromethyl-$\Delta^{1,4,6}$-pregnatrien-17α-ol-3,20-dione-17α-acetate.

6. A compound of the following formula:

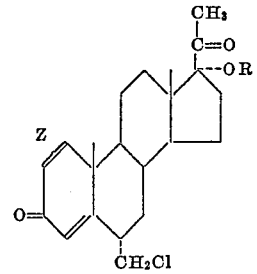

wherein R is selected from the group consisting of hydrogen and a hydrocarbon carboxylic acyl group of less than 12 carbon atoms and Z is selected from the group consisting of a double bond and a saturated linkage between C–1 and C–2.

7. 6α-chloromthyl-$\Delta^{4}$-pregnen-17α-ol-3,20-dione.

8. 6α-chloromethyl-$\Delta^{1,4}$-pregnadien-17α-ol-3,20-dione.

9. The hydrocarbon carboxylic acid esters of less than 12 carbon atoms of 6α-chloromethyl-$\Delta^{4}$-pregnen-17α-ol-3,20-dione.

10. 6α-chloromethyl-$\Delta^{4}$-pregnen-17α-ol-3,20-dione 17-acetate.

11. The hydrocarbon carboxylic acid esters of less than 12 carbon atoms of 6α-chloromethyl-$\Delta^{1,4}$-pregnadien-17α-ol-3,20-dione.

12. 6α-chloromethyl-$\Delta^{1,4}$-pregnadien-17α-ol-3,20-dione 17α-acetate.

13. 6β-chloromethyl-$\Delta^{1,4}$-pregnadien-17α-ol-3,20-dione.

14. 6β-chloromethyl-allopregnan-17α-ol-3,20-dione.

No references cited.